US006671524B1

United States Patent
Sudo (10) Patent No.: US 6,671,524 B1
(45) Date of Patent: Dec. 30, 2003

(54) BASE STATION APPARATUS AND TRANSMISSION BRANCH SELECTION METHOD

(75) Inventor: Hiroaki Sudo, Yokohama (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/457,291

(22) Filed: Dec. 9, 1999

(30) Foreign Application Priority Data

Dec. 17, 1998 (JP) .......................................... 10-359413

(51) Int. Cl.[7] ............................. H04M 1/00; H04B 1/38
(52) U.S. Cl. .................... 455/561; 455/562.1; 455/101; 455/277.1; 370/334
(58) Field of Search ........................ 455/69, 522, 561, 455/103, 127, 562, 101, 277.1, 277.2; 370/350, 503, 506, 509, 512, 514, 516, 334

(56) References Cited

U.S. PATENT DOCUMENTS

| 5,097,484 | A  | * | 3/1992  | Akaiwa          | 375/267  |
|-----------|----|---|---------|-----------------|----------|
| 5,648,992 | A  |   | 7/1997  | Wright et al.   |          |
| 6,002,672 | A  | * | 12/1999 | Todd            | 370/252  |
| 6,029,057 | A  | * | 2/2000  | Paatelma et al. | 455/277.2|
| 6,252,864 | B1 | * | 6/2001  | Hayashi         | 370/335  |
| 6,480,479 | B1 | * | 11/2002 | Miya et al.     | 370/335  |

FOREIGN PATENT DOCUMENTS

| EP | 0454585   | 10/1991 |
|----|-----------|---------|
| JP | 2-200020  | 8/1990  |
| JP | 5-29990   | 2/1993  |

OTHER PUBLICATIONS

Matsumoto et al., entitled *OFDM subchannel Space–Combining Transmission Diversity (SC–JD) for TDMA–TDD Broadband Wireless Accsess Systems*, 1998 IEICE Conference, pp. 380.

English Language Abstract of JP 5–29990.
English Language Abstract of JP 2–200020.
Article by Takahashi et al., entitled "Antenna and Multi–Carrier Combined Diversity System", IEICE Transactions on Communications, vol. E79B, No. 9, Sep. 1, 1996, pp. 1221–1226.
Article by Takahashi et al., entitled "Antenna and Multi–Carrier Combined Diversity System", IEICE Transactions on Communications, vol. E79B, No 9, Sep. 1, 1996, pp. 1221–1226.
Article by Kondo et al., entitled"Linear Predictive Transmitter Diversity for Microcellular TDMA/TDD Mobile Radio System", IEEE Vehicular Technology Conference, vol. 43, May 18, 1993, pp. 602–606.

* cited by examiner

*Primary Examiner*—Nguyen T. Vo
*Assistant Examiner*—Sujatha Sharma
(74) *Attorney, Agent, or Firm*—Greenblum & Bernstein, P.L.C.

(57) ABSTRACT

Level detectors 305 to 312 detect reception levels of uplink bursts received by their respective subcarriers/branches, then interpolation sections 313 to 320 estimate reception levels of the next uplink burst from the reception levels of a plurality of uplink bursts detected, select the branch with the maximum estimated value for each subcarrier and sends each subcarrier of the next downlink burst to be transmitted using this selected branch.

6 Claims, 5 Drawing Sheets

BASE STATION APPARATUS AND TRANSMISSION BRANCH SELECTION METHOD

BACKGROUND OF THE INVENTION

1. Field of the Invention

The present invention relates to a base station apparatus that carries out a radio communication by switching between transmission and reception every predetermined unit time using a plurality of carriers and a transmission branch selection method.

2. Description of the Related Art

In a mobile communication system, it is proposed that a base station apparatus should select a transmission branch when sending a signal to a mobile station apparatus in order to alleviate the load of signal processing on the mobile station apparatus.

Suppose a group of signals transmitted or received for a unit time of switching between transmission and reception is called "burst" here. The base station apparatus alternately performs 1-burst (downlink) transmission and 1-burst (uplink) reception.

Figure 1:
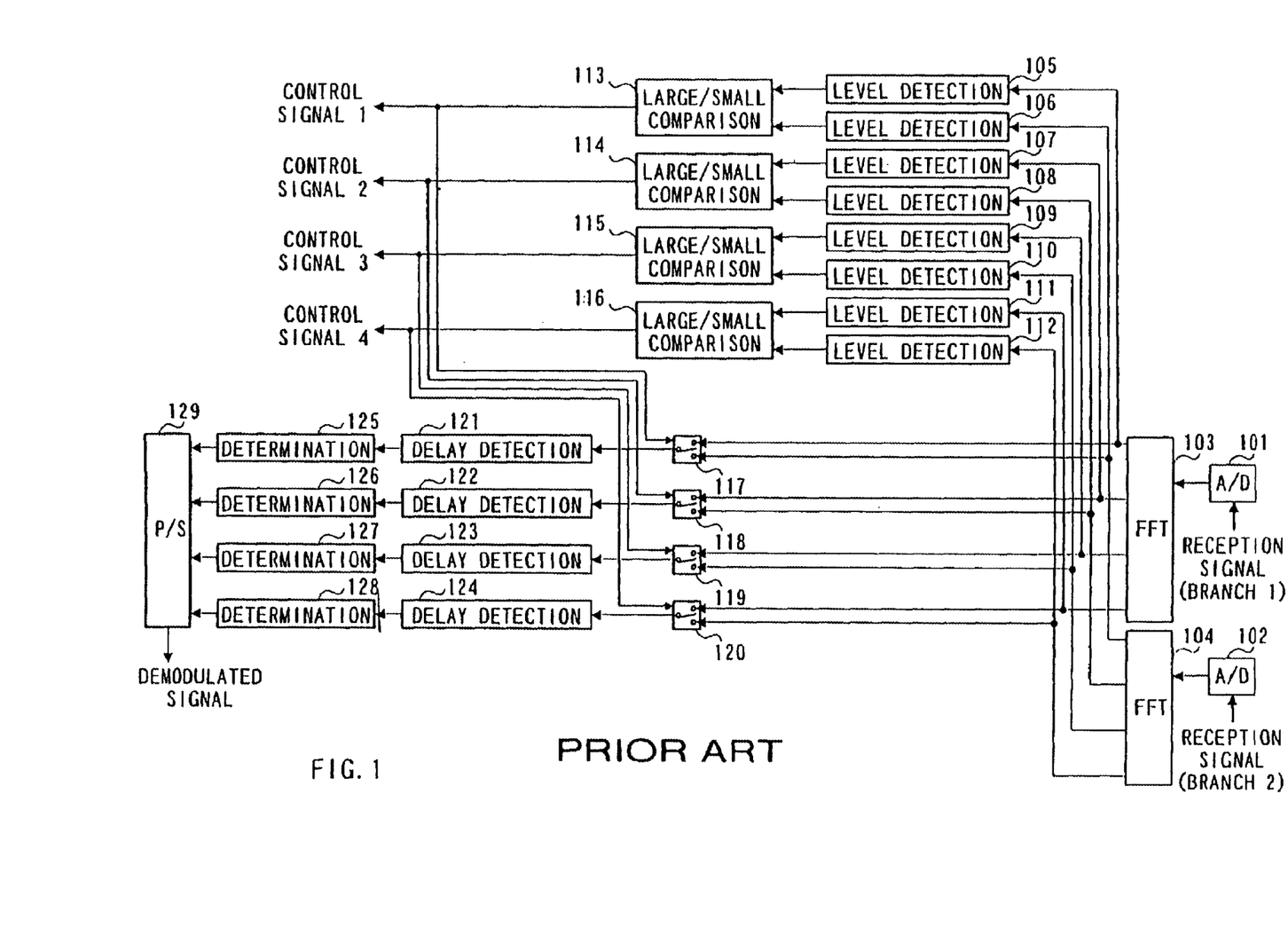
FIG. 1 is a block diagram showing a configuration of a reception system of a conventional base station apparatus.

A conventional base station apparatus and transmission branch selection method are explained below using FIG. 1 and FIG. 2. FIG. 1 is a block diagram showing a configuration of a reception system in a conventional base station apparatus and FIG. 2 is a block diagram showing a configuration of a transmission system in the conventional base station apparatus.

Figure 2:
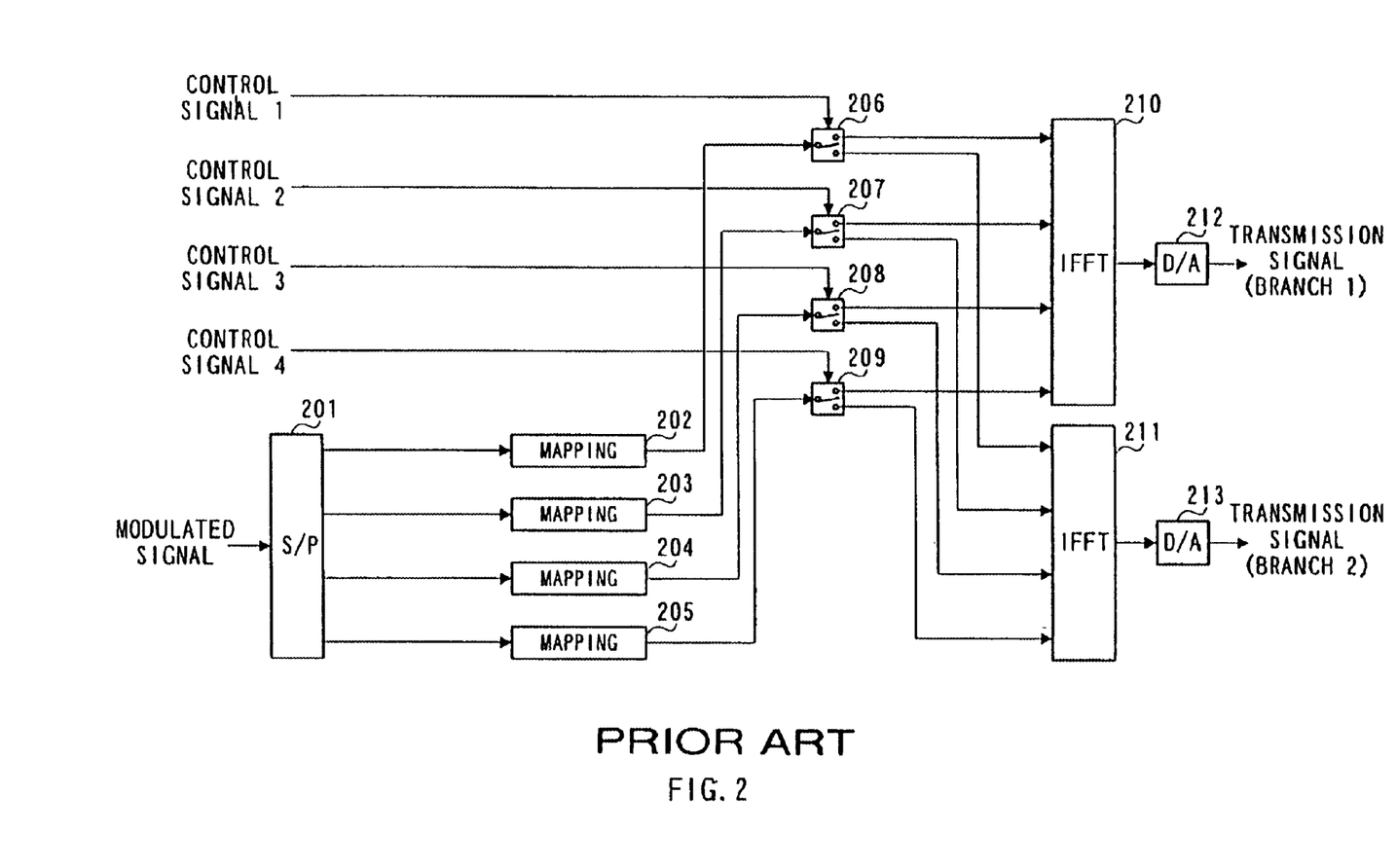
FIG. 2 is a block diagram showing a configuration of a transmission system of the conventional base station apparatus.

In FIG. 1 and FIG. 2, suppose the number of subcarriers is 4 and the number of branches is 2.

In FIG. 1, signals received from branch 1 and branch 2 (reception signals) are converted to digital signals by A/D converters 101 and 102 and FFT-processed by Fast Fourier Transform (hereinafter referred to as "FFT") circuits 103 and 104.

The reception levels of the FFT-processed reception signals are detected by level detectors 105 to 112 for their respective subcarriers. The detected reception levels are determined on a subcarrier basis by large/small comparison sections 113 to 116 as to which has a higher reception level, the signal received from branch 1 or the signal received from branch 2.

The determination results are used as control signals 1 to 4 corresponding to their respective subcarriers for switching by switches 117 to 120 and for transmission branch selection in a transmission system which will be described later.

The FFT-processed reception signals are also input to switches 117 to 120 and the reception signal with a higher reception level between the reception signal from branch 1 and the reception signal from branch 2 is output for each subcarrier from switches 117 to 120 through switchover control by control signals 1 to 4.

The output signals of switches 117 to 120 are subjected to delay detection processing by delay detectors 121 to 124, determined by determination circuits 125 to 128 and output to parallel-serial (hereinafter referred to as "P/S") converter 129. P/S converter 129 converts a plurality of parallel signals from determination circuits 125 to 128 to a serial signal and obtains a demodulated signal.

On the other hand, in FIG. 2, the modulated data are converted by serial-parallel (hereinafter referred to as "S/P") converter 201 from a serial signal to a plurality of parallel signals. The plurality of parallel signals from S/P converter 201 is each mapped by mapping circuits 202 to 205.

For the signals mapped by mapping circuits 202 to 205, either branch 1 or branch 2 is selected as their output destination by switches 206 to 209 using control signals 1 to 4 described with reference to FIG. 1.

Inverse Fast Fourier Transform (hereinafter referred to as "IFFT") circuits 210 and 211 perform IFFT processing on signals to be transmitted from branch 1 and branch 2, respectively. The IFFT-processed signals by IFFT circuits 210 and 211 are converted from digital to analog signals by D/A converters 212 and 213.

As described above, the conventional base station apparatus detects reception levels of all subcarriers of reception signals at all branches, carries out reception diversity to determine which signal has the highest reception level received from different branches for each subcarrier and select a branch from which to receive signals based on this determination result, and transmission diversity to select a branch from which to transmit signals.

However, if there is a certain time interval after an uplink burst is received until a downlink burst is transmitted, that is, in the case of an intermittent communication condition, the radio propagation environment characteristic may change in the above interval in the conventional base station apparatus. Therefore, if a branch is selected based on the reception level of the immediately preceding uplink burst to transmit each subcarrier of the next downlink burst, accurate branch selection is not made.

Moreover, if a setting is made in such a way that branches can also be switched during 1-burst transmission, bursts become discontinuous on the mobile station apparatus side causing the error rate characteristic to deteriorate.

SUMMARY OF THE INVENTION

The present invention has been implemented taking account of the points described above and it is an objective of the present invention to provide a base station apparatus and transmission branch selection method carrying out accurate transmission branch selection even in an intermittent communication condition with a certain time interval after an uplink burst is received until a downlink burst is transmitted.

This objective is achieved by the base station apparatus estimating the reception levels of the next uplink bursts to be received from the reception levels of a plurality of uplink bursts and selecting a branch to transmit each subcarrier of the next downlink burst to be transmitted based on this estimated value.

BRIEF DESCRIPTION OF THE DRAWINGS

The above and other objects and features of the invention will appear more fully hereinafter from a consideration of the following description taken in connection with the accompanying drawing wherein one example is illustrated by way of example, in which.

DETAILED DESCRIPTION OF THE PREFERRED EMBODIMENTS

With reference now to the attached drawings, the embodiments of the present invention are explained in detail below.

Embodiment 1

The base station apparatus according to the present embodiment performs transmission branch selection using reception levels estimated by means of extrapolation from reception levels of a plurality of uplink bursts.

Figure 3:
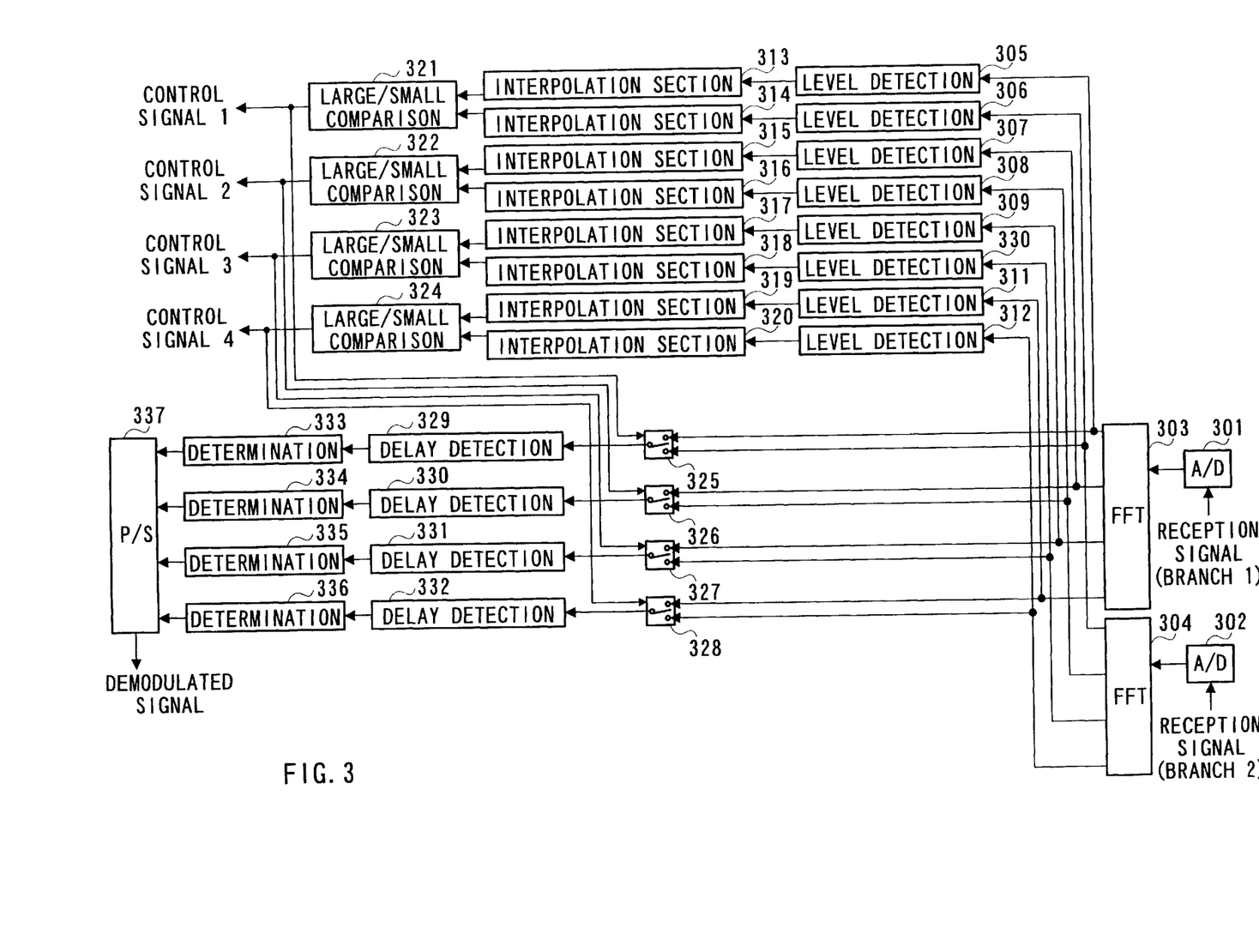
FIG. 3 is a block diagram showing a configuration of a reception system of a base station apparatus according to Embodiment 1 of the present invention.
Figure 4:
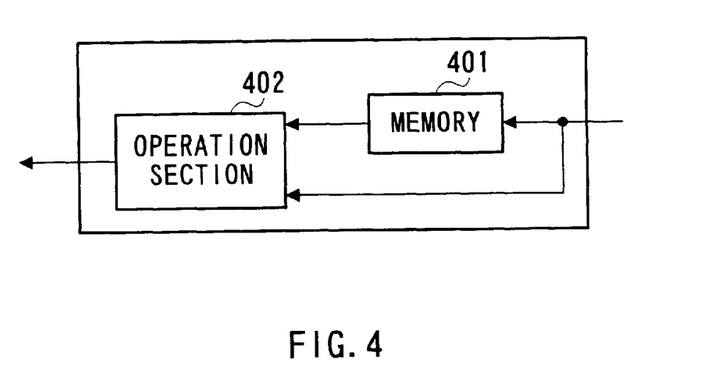
FIG. 4 is a block diagram showing a configuration of an interpolation section of the base station apparatus according to Embodiment 1 of the present invention.

The base station apparatus according to the present embodiment is explained below with reference to FIG. 3 and FIG. 4. FIG. 3 is a block diagram showing a configuration of a reception system of the base station apparatus according to Embodiment 1 of the present invention. FIG. 4 is a block diagram showing a configuration of an interpolation section of the base station apparatus according to Embodiment 1 of the present invention.

In FIG. 3, A/D converters 301 and 302 convert analog signals input to digital signals and output them to FFT circuits 303 and 304. FFT circuits 303 and 304 carry out FFT processing on the signals from A/D converters 301 and 302, respectively.

Level detectors 305 to 312 detect the reception levels of their respective branches/subcarriers (carrier waves). Interpolation sections 313 to 320 carry out extrapolation using a plurality of reception levels of the branches/subcarriers output from their respective level detectors 305 to 312 and estimate the reception levels during reception of the next uplink bursts.

Large/small comparison sections 321 to 324 compare the reception levels of the branches/subcarriers estimated by interpolation sections 313 to 320 for each subcarrier, determine which signal has the higher reception level received from the two branches and generate control signals 1 to 4 corresponding to their respective carriers.

Switching of switches 325 to 328 is controlled by the outputs of large/small comparison sections 321 to 324. Delay detectors 329 to 332 perform delay detection processing on the reception signals from branch 1 or branch 2 for their respective subcarriers. Determination circuits 333 to 336 determine the delay detection signals from delay detectors 329 to 332, respectively. P/S converter 337 converts a plurality of parallel signals from determination circuits 333 to 336 to a serial signal.

Then, the operation of the base station apparatus in the above configuration according to the present embodiment is explained. Signals received from branch 1 and branch 2 (reception signals) are converted to digital signals by A/D converters 301 and 302 and FFT-processed by FFT circuits 303 and 304.

The reception levels of the FFT-processed reception signals are detected by level detectors 305 to 312 for their respective subcarriers. The interpolation sections 313 to 320 estimate the reception levels during reception of the next uplink burst by means of extrapolation for their respective subcarriers and the estimated reception levels are output to large/small comparison sections 321 to 324. Large/small comparison sections 321 to 324 determine which reception signal has a higher estimated reception level, the reception signal from branch 1 or the reception signal from branch 2.

The determination results are used as control signals 1 to 4 corresponding to their respective subcarriers for switching of switches 325 to 328 and for transmission branch selection in a transmission system which will be described later.

Furthermore, the FFT-processed reception signals are input to switches 325 to 328. In switches 325 to 328, the reception signals with a higher reception level from branch 1 or branch 2 are output from switches 325 to 328 for each subcarrier under switching control by control signals 1 to 4.

The signals output from switches 325 to 328 are subjected to delay detection processing by delay detectors 329 to 332 and determined by determination circuits 333 to 336, respectively. A plurality of parallel signals from determination circuits 333 to 336 is converted by P/S converter 337 to a serial signal. In this way, a demodulated signal is obtained.

This is the explanation of the operation of the reception system. In the transmission system, a branch used to transmit a transmission signal is selected for each subcarrier based on control signals 1 to 4, that is, the branch selection result in large/small comparison sections 312 to 324 as in the case of the conventional system.

Then, the configuration and operation of interpolation sections 313 to 320 are explained using FIG. 4. As shown in FIG. 4, each interpolation section comprises memory 401 and operation section 402.

The reception levels of the branches/subcarriers, which are the outputs of level detectors 305 to 312, are input to memory 401 in their respective interpolation sections.

Memory 401 stores the reception level during reception of the immediately preceding uplink burst. Operation section 402 estimates the reception level of the next uplink burst to be received by means of extrapolation using the reception level of the uplink burst received and the reception level of the immediately preceding uplink burst received.

As shown above, the present embodiment estimates the reception levels of the next uplink burst to be received by means of extrapolation using the reception levels of the uplink bursts received and the reception level of the immediately preceding uplink burst received and selects a branch for each subcarrier of the next downlink burst to be transmitted based on the size of this estimated value, allowing accurate transmission branch selection even in an intermittent communication condition with a certain interval after an uplink burst is received until a downlink burst is transmitted.

Furthermore, according to the present invention, since the base station apparatus performs transmission branch selection, that is, transmission diversity, a communication terminal apparatus (for example, a mobile communication apparatus) that carries out a radio communication with this base station apparatus need not carry out diversity and does not require a configuration for diversity. This allows the communication terminal apparatus above to have a simpler configuration.

Embodiment 2

The base station apparatus according to the present embodiment has the same configuration as that of Embodiment 1 except that the interpolation section uses a linear interpolation method.

Figure 5:
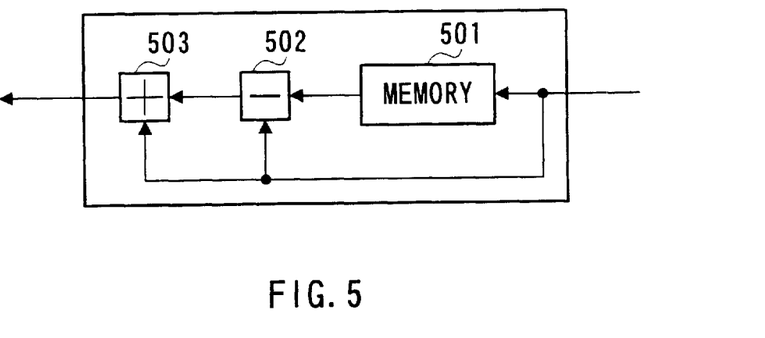
FIG. 5 is a block diagram showing a configuration of an interpolation section of a base station apparatus according to Embodiment 2 of the present invention.

The interpolation section of the base station apparatus according to the present embodiment is explained below with reference to FIG. 5. FIG. 5 is a block diagram showing the configuration of the interpolation section according to Embodiment 2 of the present invention.

The interpolation section according to the present embodiment comprises memory 501, subtractor 502 and adder 503. Memory 501 stores the reception level of the immediately preceding uplink burst received. Subtractor 502 calculates a difference by subtracting the reception level of the immediately preceding uplink burst from the reception level of the uplink burst. Adder 503 adds the difference, which is the output of subtractor 502, to the reception level of the uplink burst received.

As shown above, the present embodiment estimates the reception levels of the next uplink burst to be received by means of linear interpolation using the reception levels of the uplink bursts received and the reception levels of the immediately preceding uplink burst received, and selects a branch from which to transmit each subcarrier of the next downlink burst to be transmitted based on the size of this estimated value. This allows accurate transmission branch selection even in an intermittent communication condition with a certain time interval after an uplink burst is received until a downlink burst is transmitted.

Furthermore, the use of linear interpolation as the interpolation method allows a simpler configuration of the base station apparatus than Embodiment 1, which uses extrapolation.

In the present embodiment, the base station apparatus performs transmission branch selection, that is, transmission diversity, and therefore a communication terminal apparatus (for example, mobile station apparatus), which carries out a radio communication with this base station apparatus, need not perform diversity. Thus, this communication terminal apparatus need not have a diversity configuration, and therefore can have a simpler apparatus configuration.

If the time interval of receiving uplink bursts is different from the time interval after an uplink burst is received until a downlink burst is transmitted, it is possible to perform extrapolation on the difference which is the output of subtractor 502 by carrying out weighting processing according to the ratio of the "time interval after an uplink burst is received until a downlink burst is transmitted" to the "time interval of receiving uplink bursts" and then adding up the differences subjected to weighting processing by adder 503.

For example, if the time interval after an uplink burst is received until a downlink burst is transmitted is ¼ of the time interval of receiving uplink bursts, the difference which is the output of subtractor 502 is multiplied by ¼ and output to adder 503. This is expressed as follows:

$$TX(n)=RX(n)+\{RX(n)-RX(n-1)\}/4 \quad (1)$$

where TX (n) is an extrapolation signal for the reception level of an uplink burst at time n and RX (n) is the reception level of an uplink burst at time n.

In the example above, if transmission of an uplink burst is skipped once, transmission of a downlink burst is further delayed by the time interval of receiving uplink bursts, and therefore expression (1) above is changed as follows:

$$TX(n)=RX(n)+\{RX(n)-RX(n-1)\}\cdot(1+¼) \quad (2)$$

Embodiment 3

The base station apparatus according to the present embodiment has the same configuration as that of Embodiment 1 except that averaging processing is performed before extrapolating reception levels of uplink bursts received.

Figure 6:
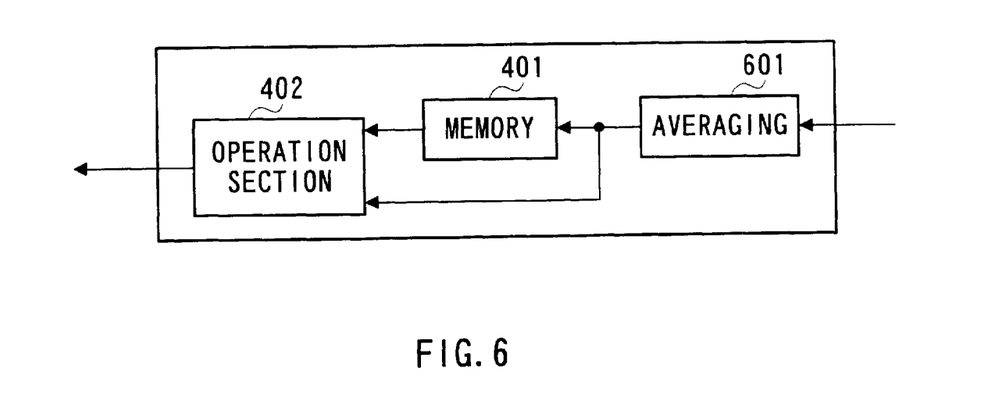
FIG. 6 is a block diagram showing a configuration of an interpolation section of a base station apparatus according to Embodiment 3 of the present invention.

The base station apparatus according to the present embodiment is explained below with reference to FIG. 6. FIG. 6 is a block diagram showing the configuration of the interpolation section according to Embodiment 3 of the present invention.

The interpolation section according to the present embodiment comprises averaging circuit 601 that performs averaging processing on reception levels, which are the outputs of the level detectors and memory 401 and operation section 402 performs extrapolation using reception levels after the averaging processing. The averaging processing in averaging circuit 601 is performed on a 1-burst portion, for example.

Thus, the present embodiment performs extrapolation using reception levels after averaging processing, and therefore allows more accurate extrapolation than Embodiment 1.

In the present embodiment, the base station apparatus performs transmission branch selection, that is, transmission diversity, and thus a communication terminal apparatus (for example, a mobile station apparatus), which carries out a radio communication with this base station apparatus, need not perform diversity. Thus, this communication terminal apparatus needs no diversity configuration, and therefore can have a simpler apparatus configuration.

The averaging processing according to the present embodiment is also applicable when performing interpolation other than extrapolation.

Embodiment 4

The base station apparatus according to the present embodiment inserts a phase reference symbol, which is a known symbol, into a transmission signal when branches are switched during 1-burst transmission. That is, if the apparatus has such a configuration that allows switching of branches during 1-burst transmission, when branches are switched during burst transmission, the bursts become discontinuous preventing the mobile station apparatus from establishing synchronization. Therefore, when branches are switched during burst transmission, the base station apparatus according to the present embodiment inserts a phase reference symbol into the transmission signal.

Figure 7:
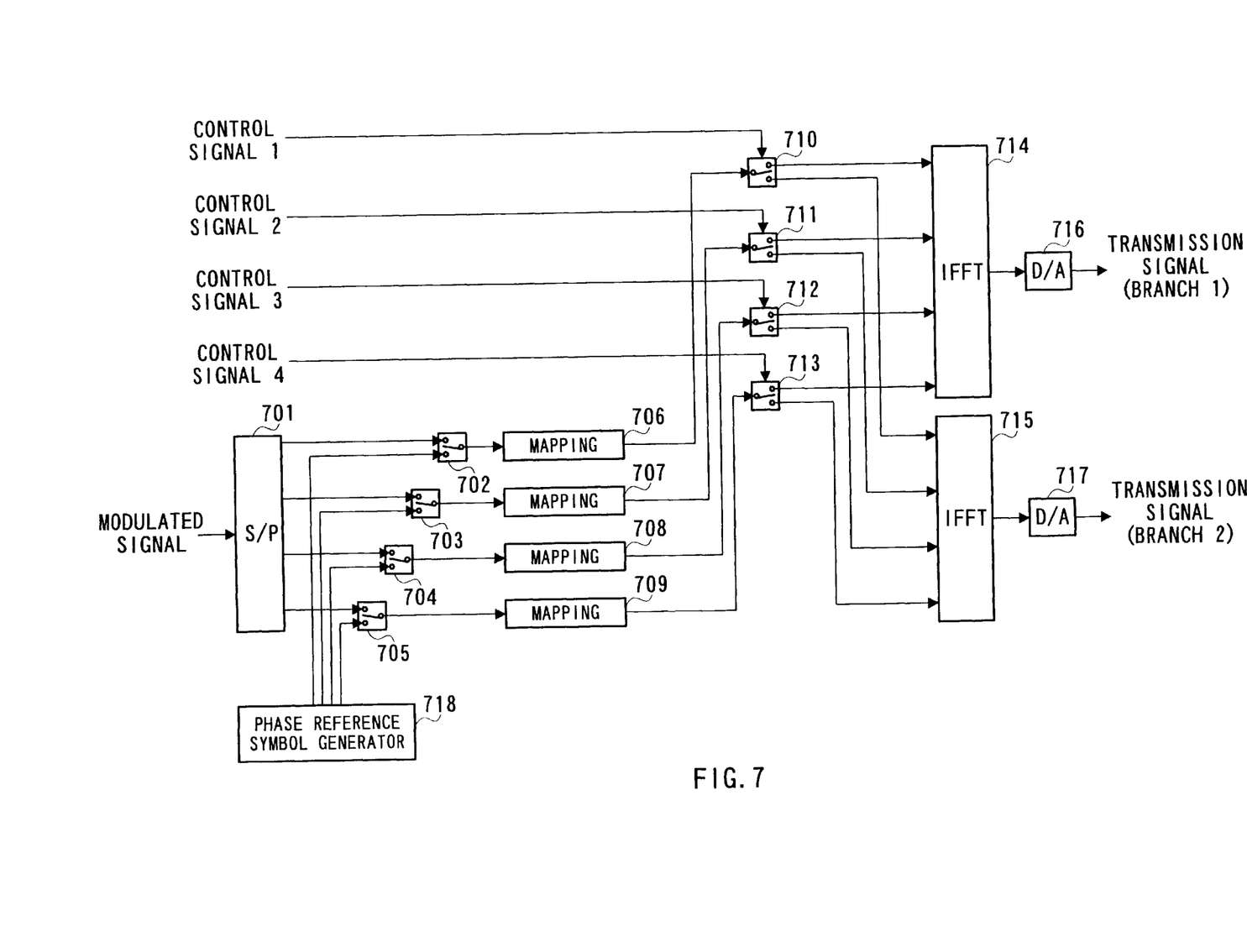
FIG. 7 is a block diagram showing a configuration of a transmission system of a base station apparatus according to Embodiment 4 of the present invention.

The base station apparatus according to the present embodiment is explained below with reference to FIG. 7. FIG. 7 is a block diagram showing a configuration of a transmission system of the base station apparatus according to Embodiment 4 of the present invention.

In FIG. 7, S/P converter 701 converts a serial demodulated signal to a plurality of parallel signals. Switching of switches 702 to 705 is controlled by control signals 1 to 4, respectively and switches 702 to 705 selectively output the output of S/P converter 701 or the output of phase reference symbol generator 718 which will be described later.

Mapping circuits 706 to 709 perform mapping for each subcarrier. Switches 710 to 713, controlled by control signals 1 to 4, switch the output destination for each subcarrier. IFFT circuits 714 and 715 perform IFFT processing on the input signals. D/A converters 716 and 717 convert the IFFT-processed signals to analog signals.

Phase reference symbol generators 718 generate phase reference symbols used to synchronize in delay detection processing.

Then, the operation of the base station apparatus according to the present embodiment in the above configuration is explained.

In FIG. 7, the modulated transmission data are converted by S/P converter 701 from a serial signal to a plurality of parallel signals. The plurality of signals from S/P converter 701 are mapped by mapping circuits 706 to 709.

The mapped signals are output to the output destinations, which are switched by switches 710 to 713 according to which branch they are transmitted from, branch 1 or branch 2.

IFFT circuits 714 and 715 carry out IFFT processing on the signals transmitted from branch 1 or branch 2. The IFFT-processed signals are converted by D/A converters 716 and 717 from digital to analog signals.

Furthermore, if one of switches 710 to 713 is switched by a control signal during 1-burst transmission, switching of switches 702 to 705 that allow the corresponding subcarriers to pass is controlled by control signals 1 to 4 and phase reference symbols, which are the outputs of phase reference symbol generator 718, are inserted into the transmission signals.

As shown above, according to the present embodiment, when switching branches during 1-burst transmission, phase reference symbols are inserted into transmission signals, and therefore the mobile station apparatus can establish synchronization even if bursts become discontinuous due to switching of branches through transmission branch selection during burst transmission.

Furthermore, according to the present embodiment, the base station apparatus performs transmission branch selection, that is, transmission diversity, and therefore a communication terminal apparatus (for example, mobile station apparatus) that carries out a radio communication with this base station apparatus need not carry out diversity. Thus, this communication terminal apparatus needs no configuration for diversity and can have a simpler apparatus configuration.

If synchronization detection processing is performed instead of delay detection processing, using pilot symbols instead of phase reference symbols can obtain the same effects as delay detection processing.

Embodiments 1 to 4 above describe the application to a radio communication supposing the number of subcarriers is 4 and the number of branches is 2, but the present invention is not limited to this; it is also applicable to other cases with any number of subcarriers and branches.

Furthermore, Embodiments 1 to 4 above describe examples of carrying out interpolation using 2 values; the reception level of an uplink burst received and the reception level of the immediately preceding uplink burst received, but the present invention is also applicable to cases where any number of reception levels are used for interpolation.

In this case, storing more reception levels in memory makes it possible to perform interpolation using two or more reception levels. Furthermore, when performing interpolation using two values, it is not necessary to limit one of the two values to the reception level of the immediately preceding uplink burst received, but it is possible to freely extract or select from among the reception levels of already received uplink bursts.

Moreover, it is possible to freely set signals included in one burst. That is, the unit time of switching between transmission and reception can be set to any length of time.

The base station apparatus of the present invention comprises level detector for detecting reception levels of a group of reception signals received for a unit time of switching between transmission and reception for each carrier and reception branch, estimator for estimating the reception levels of the group of reception signals to be received next from the detected reception levels for each carrier and reception branch, transmission branch selector for selecting a branch to be used for transmission based on the estimated reception levels for each carrier.

The present invention estimates the reception level of the next uplink burst to be received from the reception levels of a plurality of uplink bursts received and selects a branch to transmit each subcarrier of the next downlink burst to be transmitted based on the size of this estimated value, allowing accurate transmission branch selection even in an intermittent communication condition with a certain interval after an uplink burst is received until a downlink burst is transmitted.

The estimation section of the base station apparatus of the present invention estimates the reception levels of the group of reception signals to be received next by means of extrapolation.

The present invention estimates the reception levels of the next uplink burst to be received from the reception levels of a plurality of uplink bursts received by means of extrapolation and selects a branch to transmit each subcarrier of the next downlink burst to be transmitted based on the size of this estimated value, allowing accurate transmission branch selection even in an intermittent communication condition with a certain interval after an uplink burst is received until a downlink burst is transmitted.

The estimation section of the base station apparatus of the present invention estimates the reception levels of the group of reception signals to be received next by means of linear interpolation.

The present invention estimates the reception levels of the next uplink burst to be received from the reception levels of a plurality of uplink bursts received by means of linear interpolation and selects a branch to transmit each subcarrier of the next downlink burst to be transmitted based on the size of this estimated value, allowing accurate transmission branch selection even in an intermittent communication condition with a certain interval after an uplink burst is received until a downlink burst is transmitted. The use of linear interpolation as the interpolation method can have a simpler configuration of the base station apparatus than using extrapolation.

The estimation section of the base station apparatus of the present invention comprises averaging device for carrying out averaging processing on the detected reception levels.

The present invention performs interpolation using the averaged reception levels, improving the accuracy of estimation of reception levels allowing more accurate transmission branch selection.

The base station apparatus of the present invention comprises known symbol generator for generating known symbols, wherein said transmission branch selector inserts known symbols which are the outputs of said known symbol generator when branches are switched during transmission of a group of transmission signals for the unit time.

When switching branches during 1-burst transmission, the present invention inserts phase reference symbols or pilot symbols, and therefore the mobile station can establish synchronization even if bursts become discontinuous by switching branches through transmission branch selection during 1-burst transmission.

The communication terminal apparatus of the present invention carries out a radio communication with the base station apparatus and the base station apparatus comprises level detector for detecting reception levels of a group of reception signals received for a unit time of switching between transmission and reception for each carrier and reception branch, estimator for estimating the reception levels of the group of reception signals to be received next from the detected reception levels for each carrier and reception branch, transmission branch selector for selecting a branch to be used for transmission based on the estimated reception levels for each carrier.

According to the present invention, the base station apparatus performs transmission branch selection, that is, transmission diversity, and therefore a communication terminal apparatus (for example a mobile communication apparatus) that carries out a radio communication with this base station apparatus need not carry out diversity, and requires no configuration for diversity. This simplifies the apparatus configuration.

The transmission branch selection method of the present invention comprises the level detecting step of detecting reception levels of a group of reception signals received for a unit time of switching between transmission and reception for each carrier and reception branch, the estimating step of estimating the reception levels of the group of reception signals to be received next from the detected reception levels for each carrier and reception branch, and the transmission branch selecting step of selecting a branch to be used for transmission based on the estimated reception levels for each carrier.

The present invention estimates the reception levels of the next uplink burst to be received from the reception levels of a plurality of uplink bursts received and selects a branch to transmit each subcarrier of the next downlink burst to be transmitted based on the size of this estimated value, allowing accurate transmission branch selection even in an intermittent communication condition with a certain interval after an uplink burst is received until a downlink burst is transmitted.

The estimation step of the transmission branch selection method of the present invention estimates the reception levels of the group of reception signals to be received next by means of extrapolation.

The present invention estimates the reception levels of the next uplink burst to be received from the reception levels of a plurality of uplink bursts received by means of extrapolation and selects a branch to transmit each subcarrier of the next downlink burst to be transmitted, allowing accurate transmission branch selection even in an intermittent communication condition with a certain interval after an uplink burst is received until a downlink burst is transmitted.

The estimation step of the transmission branch selection method of the present invention estimates the reception levels of the group of reception signals to be received next by means of linear interpolation.

The present invention estimates the reception levels of the next uplink burst to be received from the reception levels of a plurality of uplink bursts received by means of linear interpolation and selects a branch to transmit each subcarrier of the next downlink burst to be transmitted, allowing accurate transmission branch selection even in an intermittent communication condition with a certain interval after an uplink burst is received until a downlink burst is transmitted. The use of linear interpolation as the interpolation method can have a simpler configuration of the base station apparatus than using extrapolation.

The estimation step of the transmission branch selection method of the present invention performs averaging processing on the detected reception levels and then uses the averaging processed reception levels for interpolation processing.

The present invention performs interpolation using the averaged reception levels, and therefore it improves the accuracy of estimation of reception levels and allows more accurate transmission branch selection.

The transmission branch selection method of the present invention comprises the known symbol generating step of generating known symbols, wherein said transmission branch selecting step inserts known symbols which are the outputs of said known symbol generating step when branches are switched during transmission of a group of transmission signals for the unit time.

When switching branches during 1-burst transmission, the present invention inserts phase reference symbols or pilot symbols, and therefore the mobile station can establish synchronization even if bursts become discontinuous by switching branches through transmission branch selection during 1-burst transmission.

The present invention is not limited to the above described embodiments, and various variations and modifications may be possible without departing from the scope of the present invention.

This application is based on the Japanese Patent Application No.HEI 10-359413 filed on Dec. 17, 1998, entire content of which is expressly incorporated by reference herein.

What is claimed is:

1. A base station apparatus that carries out a radio communication using a plurality of carriers and reception branches, the base station apparatus comprising:
   a level detector that detects a reception level of an uplink burst for each carrier and each reception branch;
   an estimator that estimates, for each carrier and each reception branch, a reception level of a next uplink burst to be received, based on a detected reception level of a current uplink burst and a detected reception level of a preceding uplink burst; and
   a transmission branch selector that selects a transmission branch based on the estimated reception level of the next uplink burst for each carrier,
   wherein said estimator estimates the reception level of the next uplink burst to be received by adding a weighted difference to the detected reception level of the current uplink burst;
   the weighted difference being obtained by calculating a difference between the detected reception levels of the current uplink burst and the preceding uplink burst, and by multiplying the calculated difference by a ratio of a first time interval to a second time interval;
   the first time interval being a time interval between reception of the uplink burst and transmission of a downlink burst, the second time interval being a time interval between reception of the uplink bursts.

2. The base station apparatus according to claim 1, wherein said estimator comprises an averager that averages the detected reception levels of a burst of each of the uplink bursts for each carrier and each reception branch.

3. The base station apparatus according to claim 1, further comprising a known symbol generator that generates a known symbol for each carrier and each transmission branch, wherein said transmission branch selector inserts the known symbol into the downlink burst when the transmission branch is switched during transmission of the downlink burst.

4. A transmission branch selection method for use with a base station apparatus that carries out a radio communication using a plurality of carriers and reception branches, the transmission branch selection method comprising:

- detecting a reception level of an uplink burst for each carrier and each reception branch;
- estimating, for each carrier and each reception branch, a reception level of a next uplink burst to be received, based on a detected reception level of a current uplink burst and a detected reception level of a preceding uplink burst; and
- selecting a transmission branch based on the estimated reception level of the next uplink burst for each carrier, wherein the estimating estimates the reception level of the next uplink burst to be received by adding a weighted difference to the detected reception level of the current uplink burst;
- the weighted difference being obtained by calculating a difference between the detected reception levels of the current uplink burst and the preceding uplink burst, and by multiplying the calculated difference by a ratio of a first time interval to a second time interval;
- the first time interval being a time interval between reception of the uplink burst and transmission of a downlink burst, the second time interval being a time interval between reception of the uplink bursts.

5. The method according to claim 4, further comprising:

averaging the detected reception levels of a burst of each of the uplink bursts for each carrier and each reception branch.

6. The method according to claim 4, further comprising:

- generating a known symbol for each carrier and each transmission branch; and
- inserting the known symbol into the downlink burst when the transmission branch is switched during transmission of the downlink burst.

* * * * *